(12) United States Patent
Tanio (10) Patent No.: US 10,481,529 B2
(45) Date of Patent: Nov. 19, 2019

(54) ELECTRICALLY CONDUCTIVE RUBBER COMPOSITION, TRANSFER ROLLER, PRODUCTION METHOD FOR THE TRANSFER ROLLER, AND IMAGE FORMING APPARATUS

(71) Applicant: SUMITOMO RUBBER INDUSTRIES, LTD., Kobe-shi, Hyogo (JP)

(72) Inventor: Yusuke Tanio, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 128 days.

(21) Appl. No.: 15/635,434

(22) Filed: Jun. 28, 2017

(65) Prior Publication Data

US 2018/0032002 A1    Feb. 1, 2018

(30) Foreign Application Priority Data

Jul. 27, 2016  (JP) .................................. 2016-147286

(51) Int. Cl.
*G03G 15/16* (2006.01)
*B29C 48/09* (2019.01)
(Continued)

(52) U.S. Cl.
CPC ....... *G03G 15/162* (2013.01); *B29C 48/0012* (2019.02); *B29C 48/022* (2019.02);
(Continued)

(58) Field of Classification Search
CPC .................................................. G03G 15/162
See application file for complete search history.

(56) References Cited

U.S. PATENT DOCUMENTS

2015/0034877 A1* 2/2015 Tanio ................. G03G 15/1685
252/500

FOREIGN PATENT DOCUMENTS

JP       2014-231187 A    12/2014
JP        2015-34878 A     2/2015

* cited by examiner

*Primary Examiner* — Arrie L Reuther
(74) *Attorney, Agent, or Firm* — Birch, Stewart, Kolasch & Birch LLP (57) ABSTRACT

An electrically conductive rubber composition is provided, which is usable for production of a transfer roller of a highly flexible foam satisfying requirements for cost reduction and weight reduction and having smaller foam cell diameters and, hence, ensuring higher-quality image formation with smaller environment-dependent variations in roller resistance. A transfer roller produced from the electrically conductive rubber composition, a production method for the transfer roller, and an image forming apparatus including the transfer roller are also provided. The electrically conductive rubber composition contains a rubber component including SBR and/or BR, EPDM and epichlorohydrin rubber, a crosslinking component, and 4 to 6 parts by mass of a foaming agent and 1.5 to 2.7 parts by mass of a foaming assisting agent based on 100 parts by mass of the rubber component. The transfer roller (1) is produced by extruding the electrically conductive rubber composition into a tubular body and performing an in-can vulcanization process on the tubular body. The image forming apparatus incorporates the transfer roller.

12 Claims, 1 Drawing Sheet

(51) Int. Cl.
  *B29C 48/00* (2019.01)
  *C08J 9/00* (2006.01)
  *B29C 48/78* (2019.01)
  *B29K 9/06* (2006.01)
  *B29K 423/00* (2006.01)
  *B29K 433/18* (2006.01)
  *B29K 471/00* (2006.01)
  *B29K 507/04* (2006.01)
  *B29L 31/00* (2006.01)
  *C08J 9/10* (2006.01)

(52) U.S. Cl.
  CPC .............. *B29C 48/09* (2019.02); *B29C 48/78* (2019.02); *C08J 9/0028* (2013.01); *C08J 9/0061* (2013.01); *G03G 15/1685* (2013.01); *B29C 48/0022* (2019.02); *B29K 2009/06* (2013.01); *B29K 2423/16* (2013.01); *B29K 2433/18* (2013.01); *B29K 2471/02* (2013.01); *B29K 2507/04* (2013.01); *B29K 2995/0005* (2013.01); *B29L 2031/767* (2013.01); *C08J 9/0066* (2013.01); *C08J 9/103* (2013.01); *C08J 2201/026* (2013.01); *C08J 2201/03* (2013.01); *C08J 2203/04* (2013.01); *C08J 2205/044* (2013.01); *C08J 2205/06* (2013.01); *C08J 2309/00* (2013.01); *C08J 2309/02* (2013.01); *C08J 2309/06* (2013.01); *C08J 2409/02* (2013.01); *C08J 2409/06* (2013.01); *C08J 2411/00* (2013.01); *C08J 2423/16* (2013.01); *C08J 2433/06* (2013.01); *C08J 2471/03* (2013.01)

ELECTRICALLY CONDUCTIVE RUBBER COMPOSITION, TRANSFER ROLLER, PRODUCTION METHOD FOR THE TRANSFER ROLLER, AND IMAGE FORMING APPARATUS

TECHNICAL FIELD

The present invention relates to an electrically conductive rubber composition, for in-can vulcanization, which can be foamed and crosslinked in a vulcanization can by applying pressure and heat thereto with pressurized steam, a transfer roller produced from the electrically conductive rubber composition, a production method for the transfer roller, and an image forming apparatus including the transfer roller.

BACKGROUND ART

In an electrophotographic image forming apparatus such as a laser printer, an electrostatic copying machine, a plain paper facsimile machine or a printer-copier-facsimile multifunction machine, an image is generally formed on a surface of a sheet such as a paper sheet or a plastic film through the following process steps.

First, a photoelectrically conductive surface of a photoreceptor body is evenly electrically charged, and then exposed to light, whereby an electrostatic latent image corresponding to an image to be formed on the sheet is formed on the surface of the photoreceptor body (charging step and exposing step).

In turn, toner (minute color particles) preliminarily electrically charged at a predetermined potential is brought into contact with the surface of the photoreceptor body. Thus, the toner selectively adheres to the surface of the photoreceptor body according to the potential pattern of the electrostatic latent image, whereby the electrostatic latent image is developed into a toner image (developing step).

Subsequently, the toner image formed by the development is transferred onto the surface of the sheet (transfer step), and fixed to the surface of the sheet (fixing step). Thus, the image is formed on the surface of the sheet.

Further, toner remaining on the surface of the photoreceptor body after the transfer of the toner image is removed, whereby the photoreceptor body is ready for the next image formation (cleaning step).

The transfer step is performed by directly transferring the toner image from the surface of the photoreceptor body to the surface of the sheet or by primarily transferring the toner image onto a surface of an image carrier and secondarily transferring the toner image onto the surface of the sheet.

In the transfer step, an electrically conductive transfer roller of a rubber foam is generally used for transferring the toner image onto the surface of the sheet or onto the surface of the image carrier.

The transfer roller is generally produced from an electrically conductive rubber composition which contains a rubber, a crosslinking component for crosslinking the rubber, and a foaming agent thermally decomposable to generate gas for foaming the rubber, and is imparted with the electrical conductivity by using an ion conductive rubber as the rubber or by blending an electrically conductive agent.

That is, the transfer roller is produced by forming the electrically conductive rubber composition into a tubular body, foaming and crosslinking the rubber composition of the tubular body in a vulcanization can by applying pressure and heat to the tubular body with pressurized steam, secondarily crosslinking the rubber composition of the foamed and crosslinked tubular body in an oven or the like, cooling the tubular body, and polishing the tubular body to a predetermined outer diameter.

In Patent Document 1, styrene butadiene rubber (SBR) is used as the main rubber for the transfer roller instead of the most common acrylonitrile butadiene rubber (NBR), and the foaming agent and a foaming assisting agent functioning to reduce the decomposition temperature of the foaming agent for acceleration of the decomposition are blended in properly controlled proportions.

This arrangement reduces the costs of the transfer roller because the SBR is less expensive than the NBR.

Since the transfer roller has a foamed structure, the amount of the material to be used is reduced, thereby reducing the material costs of the transfer roller. Further, the weight of the transfer roller is reduced, thereby reducing the transportation costs of the transfer roller.

In addition, the proportions of the foaming agent and the foaming assisting agent are respectively controlled within predetermined ranges, thereby making it possible to reduce the cell diameters of foam cells to improve the smoothness of an outer peripheral surface of the transfer roller while imparting the transfer roller with proper flexibility. Thus, the transfer roller ensures higher-quality image formation.

That is, the blending of the foaming assisting agent reduces the decomposition temperature of the foaming agent, so that particles of the foaming agent are substantially simultaneously decomposed to foam the entire tubular body in a short period of time after the start of the heating. Therefore, expansion of the foam cells is suppressed by expansion forces of the adjacent foam cells being expanded by the foaming. As a result, the cell diameters of the respective foam cells are reduced.

Therefore, the transfer roller can be produced, which is made of a highly flexible foam satisfying requirements for cost reduction and weight reduction and having smaller cell diameters and, hence, ensures the higher-quality image formation.

According to studies conducted by the inventor of the present invention, however, the transfer roller described in Patent Document 1 problematically suffers from significant variations in roller resistance due to use environment, i.e., temperature and humidity, as compared with a transfer roller produced by using the NBR as the main rubber. The roller resistance of the transfer roller significantly varies due to differences in place in which an image forming apparatus including the transfer roller is installed, and due to differences in climate and weather even if the image forming apparatus is installed in the same place, thereby influencing the density of an image to be formed.

CITATION LIST

Patent Document

Patent Document 1: JP2015-34878A

SUMMARY OF THE INVENTION

Problem to be Solved by the Invention

It is an object of the present invention to provide an electrically conductive rubber composition which is usable for production of a transfer roller of a highly flexible foam satisfying requirements for cost reduction and weight reduction and having smaller foam cell diameters and, hence, ensuring higher-quality image formation with smaller environment-dependent variations in roller resistance.

It is another object of the present invention to provide a transfer roller produced from the electrically conductive rubber composition, a production method for the transfer roller, and an image forming apparatus including the transfer roller.

Solution to Problem

According to an inventive aspect, there is provided an electrically conductive rubber composition for in-can vulcanization, the rubber composition containing: a rubber component including ethylene propylene diene rubber (EPDM), epichlorohydrin rubber and at least one rubber selected from the group consisting of SBR and butadiene rubber (BR); a crosslinking component for crosslinking the rubber component; a foaming agent thermally decomposable to generate gas, the foaming agent being present in a proportion of not less than 4 parts by mass and not greater than 6 parts by mass based on 100 parts by mass of the overall rubber component; and a foaming assisting agent which accelerates decomposition of the foaming agent, the foaming assisting agent being present in a proportion of not less than 1.5 parts by mass and not greater than 2.7 parts by mass based on 100 parts by mass of the overall rubber component.

According to another inventive aspect, there is provided a transfer roller produced from the inventive electrically conductive rubber composition.

According to further another inventive aspect, there is provided a transfer roller production method which includes the steps of: extruding the inventive electrically conductive rubber composition into a tubular body; and foaming and crosslinking the electrically conductive rubber composition extruded into the tubular body in a vulcanization can by applying pressure and heat to the tubular body with pressurized steam through an in-can vulcanization process.

According to still another inventive aspect, there is provided an image forming apparatus which includes the inventive transfer roller.

Effects of the Invention

According to the present invention, the electrically conductive rubber composition is provided, which is usable for production of a transfer roller of a highly flexible foam satisfying requirements for cost reduction and weight reduction and having smaller foam cell diameters and, hence, ensuring higher-quality image formation with smaller environment-dependent variations in roller resistance.

According to the present invention, the transfer roller produced from the electrically conductive rubber composition, the transfer roller production method, and the image forming apparatus including the transfer roller are also provided.

EMBODIMENTS OF THE INVENTION

<<Electrically Conductive Rubber Composition>>

According to the present invention, an electrically conductive rubber composition for in-can vulcanization is provided, which contains: a rubber component including EPDM, epichlorohydrin rubber and at least one rubber selected from the group consisting of SBR and BR; a crosslinking component for crosslinking the rubber component; a foaming agent thermally decomposable to generate gas, the foaming agent being present in a proportion of not less than 4 parts by mass and not greater than 6 parts by mass based on 100 parts by mass of the overall rubber component; and a foaming assisting agent which accelerates decomposition of the foaming agent, the foaming assisting agent being present in a proportion of not less than 1.5 parts by mass and not greater than 2.7 parts by mass based on 100 parts by mass of the overall rubber component.

<Rubber Component>

In the present invention, the SBR and/or the BR, which are less expensive than the NBR, are used as amain rubber for the electrically conductive rubber composition, so that production costs for a transfer roller and hence for an image forming apparatus can be further reduced.

The use of the EPDM in combination with the SBR and/or the BR improves the ozone resistance of the transfer roller. That is, the EPDM per se is excellent in ozone resistance, and also functions to suppress the deterioration of the SBR and/or the BR due to ozone.

Further, the use of the epichlorohydrin rubber in combination with the SBR and/or the BR imparts the electrically conductive rubber composition and the transfer roller with proper ion conductivity.

As required, the rubber component may further include at least one polar rubber selected from the group consisting of acrylonitrile butadiene rubber (NBR), chloroprene rubber (CR) and acryl rubber (ACM). In this case, the SBR and/or the BR are preferably partly replaced with the polar rubber.

The use of the polar rubber in combination with the SBR and/or the BR makes it possible to finely control the roller resistance of the transfer roller, and to impart the transfer roller with a more uniform porous structure without foaming unevenness.

(SBR and/or BR)

Usable as the SBR are various SBRs synthesized by copolymerizing styrene and 1,3-butadiene by an emulsion polymerization method, a solution polymerization method and other various polymerization methods.

The SBRs include those of an oil-extension type having flexibility controlled by addition of an extension oil, and those of a non-oil-extension type containing no extension oil. Either type of SBRs is usable.

According to the styrene content, the SBRs are classified into a higher styrene content type, an intermediate styrene content type and a lower styrene content type, and any of these types of SBRs is usable. The physical properties of the transfer roller can be controlled by changing the styrene content and the crosslinking degree.

Usable as the BR are various crosslinkable BRs each having a polybutadiene structure in a molecule thereof.

Particularly, a higher cis-content BR having a cis-1,4 bond content of not less than 95% and excellent rubber characteristic properties in a temperature range from a higher temperature to a lower temperature is preferred.

The BRs include those of an oil-extension type having flexibility controlled by addition of an extension oil, and those of a non-oil-extension type containing no extension oil. Either type of BRs is usable.

One or two or more of these SBRs and/or BRs are usable.

Where the electrically conductive rubber composition does not contain the polar rubber, the proportion of the SBR and/or the BR to be blended is preferably not less than 40 parts by mass and not greater than 90 parts by mass, particularly preferably not less than 60 parts by mass and not greater than 80 parts by mass, based on 100 parts by mass of the overall rubber component. Where the electrically conductive rubber composition contains the polar rubber, the proportion of the SBR and/or the BR to be blended is preferably not less than 30 parts by mass and not greater than 50 parts by mass based on 100 parts by mass of the overall rubber component, though depending upon the proportion of the polar rubber.

If the proportion of the SBR and/or the BR is less than the aforementioned range, it will be impossible to provide the advantages of the SBR and/or the BR, i.e., to ensure higher versatility and lower costs.

If the proportion of the SBR and/or the BR is greater than the aforementioned range, on the other hand, the proportion of the EPDM is relatively reduced, making it impossible to impart the transfer roller with proper ozone resistance. Further, the proportion of the epichlorohydrin rubber is relatively reduced, making it impossible to impart the transfer roller with proper ion conductivity.

Where only one of the aforementioned SBRs and BRs is used, the aforementioned proportion is defined as the proportion of the one rubber. Where two or more of the aforementioned SBRs and BRs are used in combination, the aforementioned proportion is defined as the total proportion of the two or more rubbers. Where the oil-extension type SBR and/or BR are used, the aforementioned proportion is defined as the solid proportion of the SBR and/or the BR contained in the oil-extension type SBR and/or BR (this definition also applies in the following description).

(EPDM)

Usable as the EPDM are various EPDMs each prepared by introducing double bonds into a main chain thereof by employing a small amount of a third ingredient (diene) in addition to ethylene and propylene.

A variety of EPDM products containing different types of third ingredients in different amounts are commercially available. Typical examples of the third ingredients include ethylidene norbornene (ENB), 1,4-hexadiene (1,4-HD) and dicyclopentadiene (DCP). A Ziegler catalyst is typically used as a polymerization catalyst.

The EPDMs include those of an oil-extension type having flexibility controlled by addition of an extension oil, and those of a non-oil-extension type containing no extension oil. Either type of EPDMs is usable.

These EPDMs may be used alone or in combination.

The proportion of the EPDM to be blended is preferably not less than 5 parts by mass and not greater than 40 parts by mass, particularly preferably not greater than 20 parts by mass, based on 100 parts by mass of the overall rubber component.

If the proportion of the EPDM is less than the aforementioned range, it will be impossible to impart the transfer roller with proper ozone resistance.

If the proportion of the EPDM is greater than the aforementioned range, on the other hand, the proportion of the SBR and/or the BR is relatively reduced, making it impossible to provide the advantages of the SBR and/or the BR, i.e., to ensure higher versatility and lower costs. Further, the proportion of the epichlorohydrin rubber is relatively reduced, making it impossible to impart the transfer roller with proper ion conductivity.

(Epichlorohydrin Rubber)

Various ion-conductive polymers each containing epichlorohydrin as a repeating unit are usable as the epichlorohydrin rubber.

Examples of the epichlorohydrin rubber include epichlorohydrin homopolymers, epichlorohydrin-ethylene oxide bipolymers (ECO), epichlorohydrin-propylene oxide bipolymers, epichlorohydrin-allyl glycidyl ether bipolymers, epichlorohydrin-ethylene oxide-allyl glycidyl ether terpolymers (GECO), epichlorohydrin-propylene oxide-allyl glycidyl ether terpolymers and epichlorohydrin-ethylene oxide-propylene oxide-allyl glycidyl ether quaterpolymers, which may be used alone or in combination.

Of these epichlorohydrin rubbers, the ethylene oxide-containing copolymers, particularly the ECO and/or the GECO are preferred.

These copolymers preferably each have an ethylene oxide content of not less than 30 mol % and not greater than 80 mol %, particularly preferably not less than 50 mol %.

Ethylene oxide functions to reduce the roller resistance of the transfer roller. If the ethylene oxide content is less than the aforementioned range, however, it will be impossible to sufficiently provide this function and hence to sufficiently reduce the roller resistance.

If the ethylene oxide content is greater than the aforementioned range, on the other hand, ethylene oxide is liable to be crystallized, whereby the segment motion of molecular chains is hindered to adversely increase the roller resistance. Further, the transfer roller is liable to have an excessively high hardness after the crosslinking, and the electrically conductive rubber composition is liable to have a higher viscosity and, hence, poorer processability when being heat-melted before the crosslinking.

The ECO has an epichlorohydrin content that is a balance obtained by subtracting the ethylene oxide content from the total. That is, the epichlorohydrin content is preferably not less than 20 mol % and not greater than 70 mol %, particularly preferably not greater than 50 mol %.

The GECO preferably has an allyl glycidyl ether content of not less than 0.5 mol % and not greater than 10 mol %, particularly preferably not less than 2 mol % and not greater than 5 mol %.

Allyl glycidyl ether per se functions as side chains of the copolymer to provide a free volume, whereby the crystallization of ethylene oxide is suppressed to reduce the roller resistance of the transfer roller. However, if the allyl glycidyl ether content is less than the aforementioned range, it will be impossible to provide this function and, hence, to sufficiently reduce the roller resistance.

Allyl glycidyl ether also functions as crosslinking sites during the crosslinking of the GECO. Therefore, if the allyl glycidyl ether content is greater than the aforementioned range, the crosslinking density of the GECO is excessively increased, whereby the segment motion of molecular chains is hindered to adversely increase the roller resistance.

The GECO has an epichlorohydrin content that is a balance obtained by subtracting the ethylene oxide content and the allyl glycidyl ether content from the total. That is, the epichlorohydrin content is preferably not less than 10 mol % and not greater than 69.5 mol %, particularly preferably not less than 15 mol % and not greater than 48 mol %.

Examples of the GECO include copolymers of the three comonomers described above in a narrow sense, as well as known modification products obtained by modifying an epichlorohydrin-ethylene oxide copolymer (ECO) with allyl glycidyl ether. Any of these modification products may be used as the GECO.

The proportion of the epichlorohydrin rubber to be blended is preferably not less than 20 parts by mass and not greater than 40 parts by mass based on 100 parts by mass of the overall rubber component.

If the proportion of the epichlorohydrin rubber is less than the aforementioned range, it will be impossible to impart the transfer roller with proper ion conductivity.

If the proportion of the epichlorohydrin rubber is greater than the aforementioned range, on the other hand, the proportion of the SBR and/or the BR is relatively reduced, making it impossible to provide the advantages of the SBR and/or the BR, i.e., to ensure higher versatility and lower costs. Further, the proportion of the EPDM is relatively reduced, making it impossible to impart the transfer roller with proper ozone resistance.

(Polar Rubber)

As described above, one or two or more of the NBR, the CR and the ACM are used as the polar rubber. Particularly, the NBR and/or the CR are preferred.

The NBR is classified in a lower acrylonitrile content type, an intermediate acrylonitrile content type, an intermediate to higher acrylonitrile content type, a higher acrylonitrile content type or a very high acrylonitrile content type depending on the acrylonitrile content. Any of these types of NBRs is usable.

The CR is synthesized, for example, by emulsion polymerization of chloroprene, and is classified in a sulfur modification type or a non-sulfur-modification type depending on the type of a molecular weight adjusting agent to be employed for the emulsion polymerization, or classified in a lower crystallization speed type, an intermediate crystallization speed type or a higher crystallization speed type depending on the crystallization speed. Any of these types of CRs is usable.

The NBRs and/or the CRs include those of an oil-extension type having flexibility controlled by addition of an extension oil, and those of a non-oil-extension type containing no extension oil. Either type of NBRs and/or either type of the CRs are usable.

The proportion of the polar rubber to be blended may be properly set according to the intended roller resistance of the transfer roller, but is preferably not less than 5 parts by mass and not greater than 40 parts by mass, particularly preferably not less than 20 parts by mass, based on 100 parts by mass of the overall rubber component.

If the proportion of the polar rubber is less than the aforementioned range, it will be impossible to sufficiently provide the effect of the blending of the polar rubber for finely controlling the roller resistance of the transfer roller and suppressing uneven foaming.

If the proportion of the polar rubber is greater than the aforementioned range, on the other hand, the proportion of the SBR and/or the BR is relatively reduced, making it impossible to provide the advantages of the SBR, i.e., to ensure higher versatility and lower costs. Further, the proportion of the EPDM is relatively reduced, making it impossible to impart the transfer roller with proper ozone resistance. Further, the proportion of the epichlorohydrin rubber is relatively reduced, making it impossible to impart the transfer roller with proper ion conductivity.

<Foaming Agent>

Various foaming agents which are thermally decomposed to generate gas are usable as the foaming agent. Examples of the foaming agents include azodicarbonamide ($H_2NOCN=NCONH_2$, ADCA), 4,4'-oxybis(benzenesulfonylhydrazide) (OBSH) and N,N-dinitrosopentamethylenetetramine (DPT), which may be used alone or in combination. Particularly, the ADCA is preferred.

The proportion of the foaming agent is limited to not less than 4 parts by mass and not greater than 6 parts by mass based on 100 parts by mass of the overall rubber component for the following reason.

If the proportion of the foaming agent is less than the aforementioned range, particles of the foaming agent will be spaced greater distances from each other in the electrically conductive rubber composition, so that adjacent foam cells resulting from the respective foaming agent particles fail to mutually suppress their expansion. This increases the foam cell diameters as a whole, making it impossible to impart the transfer roller with smaller foam cell diameters suitable for higher-quality image formation.

Further, the electrically conductive rubber composition cannot be sufficiently foamed, so that the rubber hardness is excessively increased. This makes it impossible to impart the transfer roller with proper flexibility suitable for the transfer roller.

If the transfer roller has insufficient flexibility, for example, it will be impossible to bring the transfer roller into press contact with a photoreceptor body with a sufficient nip width, thereby problematically reducing the toner transfer efficiency or damaging the photoreceptor body.

If the foaming is insufficient, it will be impossible to reduce the use amount of the material for reduction in material costs and to reduce the weight of the transfer roller for reduction in transportation costs as described above.

If the proportion of the foaming agent is greater than the aforementioned range, on the other hand, the reduction in cell diameters can be achieved, but the rubber hardness will be excessively increased, making it impossible to impart the transfer roller with proper flexibility suitable for the transfer roller. This may lead to the aforementioned problems.

Where the proportion of the foaming agent falls within the aforementioned range, in contrast, it is possible to further reduce the cell diameters, while imparting the transfer roller with proper flexibility and providing the various advantages of the foaming.

<Foaming Assisting Agent>

Various foaming assisting agents functioning to reduce the decomposition temperature of the foaming agent for acceleration of the decomposition of the foaming agent are usable as the foaming assisting agent. An exemplary foaming assisting agent to be used in combination with the ADCA is a urea ($H_2NCONH_2$) foaming assisting agent.

The proportion of the foaming assisting agent to be blended is limited to not less than 1.5 parts by mass and not greater than 2.7 parts by mass based on 100 parts by mass of the overall rubber component for the following reason.

If the proportion of the foaming assisting agent is less than the aforementioned range, it will be impossible to reduce the cell diameters by the aforementioned mechanism. This increases the foam cell diameters as a whole, making it impossible to impart the transfer roller with smaller foam cell diameters suitable for higher-quality image formation.

If the proportion of the foaming assisting agent is greater than the aforementioned range, on the other hand, the transfer roller will suffer from significant environment-dependent variations in roller resistance as described above.

Although the reduction in cell diameters can be achieved, the rubber hardness will be excessively increased, making it impossible to impart the transfer roller with proper flexibility suitable for the transfer roller. This may lead to the aforementioned problems.

Where the proportion of the foaming assisting agent falls within the aforementioned range, in contrast, it is possible to suppress the environment-dependent variations in roller resistance, while reducing the cell diameters and imparting the transfer roller with proper flexibility.

For further improvement of the aforementioned effect, the proportion of the foaming assisting agent is preferably not greater than 2.5 parts by mass based on 100 parts by mass of the overall rubber component within the aforementioned range.

<Crosslinking Component>

The crosslinking component for crosslinking the rubber component includes a crosslinking agent, a crosslinking assisting agent and the like.

Particularly, a sulfur-containing crosslinking agent is preferred as the crosslinking agent.

Examples of the sulfur-containing crosslinking agent include sulfur such as sulfur powder, oil-treated sulfur powder, precipitated sulfur, colloidal sulfur and dispersive sulfur, and organic sulfur-containing compounds such as tetramethylthiuram disulfide and N,N-dithiobismorpholine. Particularly, the sulfur is preferred.

The proportion of the sulfur to be blended is preferably not less than 0.5 parts by mass and not greater than 3 parts by mass based on 100 parts by mass of the overall rubber component.

Where the oil-treated sulfur powder or the dispersive sulfur is used, for example, the proportion of the sulfur is defined as the effective proportion of sulfur contained in the oil-treated sulfur powder or the dispersive sulfur.

Examples of the crosslinking accelerating agent include a thiuram accelerating agent and a thiazole accelerating agent. Different types of crosslinking accelerating agents have different crosslinking accelerating mechanisms and, therefore, are preferably used in combination.

Examples of the thiuram accelerating agent include tetramethylthiuram monosulfide (TS), tetramethylthiuram disulfide (TT, TMT), tetraethylthiuram disulfide (TET), tetrabutylthiuram disulfide (TBT), tetrakis(2-ethylhexyl)thiuram disulfide (TOT-N) and dipentamethylenethiuram tetrasulfide (TRA), which may be used alone or in combination.

The proportion of the thiuram accelerating agent to be blended is preferably not less than 0.5 parts by mass and not greater than 3 parts by mass based on 100 parts by mass of the overall rubber component.

Examples of the thiazole accelerating agent include 2-mercaptobenzothiazole (M), di-2-benzothiazolyl disulfide (DM), a zinc salt of 2-mercaptobenzothiazole (MZ), a cyclohexylamine salt of 2-mercaptobenzothiazole (HM, M60-OT), 2-(N,N-diethylthiocarbamoylthio)benzothiazole (64) and 2-(4'-morpholinodithio)benzothiazole (DS, MDB), which may be used alone or in combination.

The proportion of the thiazole accelerating agent to be blended is preferably not less than 0.5 parts by mass and not greater than 3 parts by mass based on 100 parts by mass of the overall rubber component.

<Other Ingredients>

As required, various additives may be added to the rubber composition. Examples of the additives include a crosslinking acceleration assisting agent, an acid accepting agent and a filler.

Examples of the crosslinking acceleration assisting agent include: metal compounds such as zinc oxide (zinc white); fatty acids such as stearic acid, oleic acid and cotton seed fatty acids; and other conventionally known crosslinking acceleration assisting agents, which may be used alone or in combination.

The proportions of the crosslinking acceleration assisting agents to be added are each preferably not less than 0.1 part by mass and not greater than 7 parts by mass based on 100 parts by mass of the overall rubber component.

In the presence of the acid accepting agent, chlorine-containing gases generated from the epichlorohydrin rubber and the like during the crosslinking are prevented from remaining in the transfer roller. Thus, the acid accepting agent functions to prevent the inhibition of the crosslinking and the contamination of the photoreceptor body, which may otherwise be caused by the chlorine-containing gases.

Any of various substances serving as acid acceptors may be used as the acid accepting agent. Preferred examples of the acid accepting agent include hydrotalcites and Magsarat which are excellent in dispersibility. Particularly, the hydrotalcites are preferred.

Where the hydrotalcites are used in combination with magnesium oxide or potassium oxide, a higher acid accepting effect can be provided, thereby more reliably preventing the contamination of the photoreceptor body.

The proportion of the acid accepting agent to be added is preferably not less than 0.2 parts by mass and not greater than 5 parts by mass, particularly preferably not less than 0.5 parts by mass and not greater than 2 parts by mass, based on 100 parts by mass of the overall rubber component.

If the proportion of the acid accepting agent is less than the aforementioned range, it will be impossible to sufficiently provide the effect of the addition of the acid accepting agent. If the proportion of the acid accepting agent is greater than the aforementioned range, the transfer roller is liable to have a higher hardness after the crosslinking.

Examples of the filler include zinc oxide, silica, carbon black, clay, talc, calcium carbonate, magnesium carbonate and aluminum hydroxide, which may be used alone or in combination.

The addition of the filler improves the mechanical strength and the like of the transfer roller.

Where electrically conductive carbon black is used as the filler, it is possible to impart the transfer roller with electron conductivity.

HAF black is preferably used as the electrically conductive carbon black. The HAF black is homogenously dispersible in the electrically conductive rubber composition, making it possible to impart the transfer roller with more uniform electron conductivity.

The proportion of the electrically conductive carbon black to be added is preferably not less than 5 parts by mass and not greater than 20 parts by mass based on 100 parts by mass of the overall rubber component.

Other examples of the additives include a degradation preventing agent, an anti-scorching agent, a plasticizer, a lubricant, a pigment, an anti-static agent, a flame retarder, a neutralizing agent, a nucleating agent and a co-crosslinking agent, which may be added in proper proportions to the rubber composition.

<<Transfer Roller>>

Figure 1:
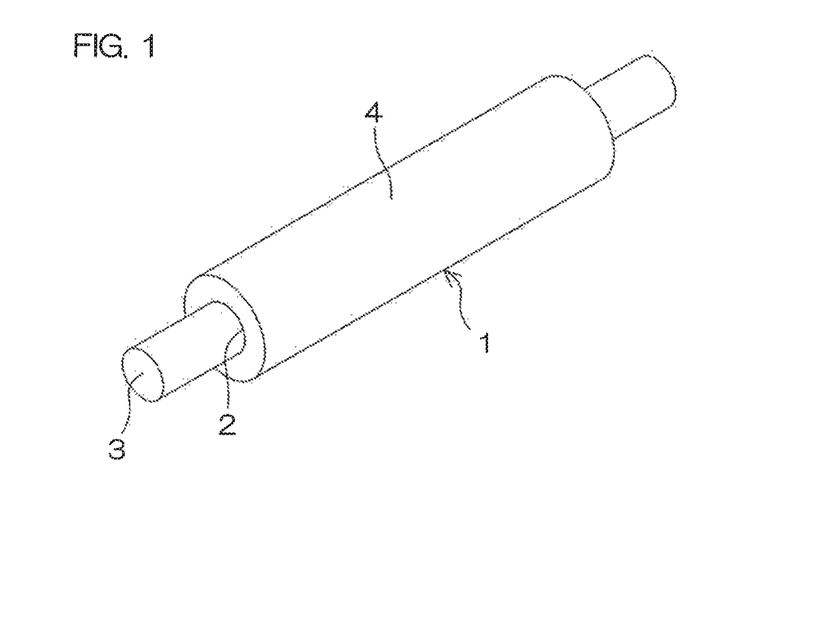
FIG. 1 is a perspective view illustrating an exemplary transfer roller according to one embodiment of the present invention.

FIG. 1 is a perspective view illustrating an exemplary transfer roller according to one embodiment of the present invention.

Referring to FIG. 1, the transfer roller 1 according to this embodiment is a tubular rubber foam of a single-layer structure formed from the electrically conductive rubber composition containing the ingredients described above, and a shaft 3 is inserted through and fixed to a center through-hole 2 of the transfer roller 1.

The shaft 3 is a unitary member made of a metal such as aluminum, an aluminum alloy or a stainless steel.

The shaft 3 is electrically connected to and mechanically fixed to the transfer roller 1, for example, via an electrically conductive adhesive agent. Alternatively, a shaft having an outer diameter that is greater than the inner diameter of the through-hole 2 is used as the shaft 3, and press-inserted into the through-hole 2 to be electrically connected to and mechanically fixed to the transfer roller 1. Thus, the shaft 3 and the transfer roller 1 are unitarily rotatable.

The transfer roller 1 has a roller resistance $R_{LL}$ (Ω) as measured in a lower temperature and lower humidity environment at a temperature of 10° C. at a relative humidity of 20% by a measurement method to be described later and a roller resistance $R_{HH}$ (Ω) as measured in a higher temperature and higher humidity environment at a temperature of 30° C. at a relative humidity of 80% by the same measurement method, and a difference log $R_{LL}$–log $R_{HH}$ between a log $R_{LL}$ value and a log $R_{HH}$ value is preferably not greater than 1.8.

Thus, the aforementioned environment-dependent variations in roller resistance can be minimized.

The difference log $R_{LL}$–log $R_{HH}$ is preferably as small as possible in the aforementioned range, and ideally zero. Where the difference log $R_{LL}$–log $R_{HH}$ is not greater than 1.8, substantially the same effect can be provided.

The transfer roller 1 preferably has an Asker-C hardness of not lower than 25 degrees and not higher than 35 degrees, and an average foam cell diameter (average cell diameter) of not greater than 350 µm.

If the Asker-C hardness is lower than 25 degrees, the transfer roller 1 is liable to suffer from permanent compressive deformation with an insufficient strength. If the Asker-C hardness is higher than 35 degrees, it will be impossible to impart the transfer roller 1 with proper flexibility.

If the average cell diameter is greater than 350 µm, the outer peripheral surface of the transfer roller will have poorer smoothness, making it impossible to form higher-quality images.

The lower limit of the average cell diameter is not particularly defined, but is preferably not less than 50 µm. If the average cell diameter is less than the aforementioned range, the Asker-C hardness of the transfer roller will be greater than the aforementioned range, making it impossible to impart the transfer roller with proper flexibility.

Where the Asker-C hardness and the average cell diameter respectively fall within the aforementioned corresponding ranges, in contrast, the transfer roller has proper flexibility and, therefore, is less liable to suffer from permanent compressive deformation. Further, the transfer roller has smaller foam cell diameters and, hence, a highly smooth outer peripheral surface, and is capable of forming higher-quality images.

The Asker-C hardness of the transfer roller 1 is measured by the following method by means of a type-C hardness tester (e.g., an Asker rubber hardness meter type-C available from Kobunshi Keiki Co., Ltd. or the like) which conforms to the Society of Rubber Industry Standards SRIS0101 "Physical Test Methods for Expanded Rubber" employed in Appendix 2 of the Japanese Industrial Standards JIS K7312$_{-1996}$ "Physical testing methods for molded products of thermosetting polyurethane elastomers."

More specifically, opposite end portions of the shaft 3 unified with the transfer roller 1 as described above are fixed to a support base and, in this state, an indenter point of the aforementioned Type-C hardness tester is pressed against a middle portion of the transfer roller 1, and the Asker-C hardness of the transfer roller 1 is measured with application of a load of 10 N (≈1 kgf).

The average foam cell diameter is determined by observing the outer peripheral surface 4 of the transfer roller 1 at a magnification of 100× by means of a microscope, measuring the major diameters (µm) and the minor diameters (µm) of 30 largest foam cells in the field of view of the microscope, calculating the cell diameter of each of the foam cells from the following expression (1), and averaging the cell diameters of the foam cells.

$$\text{Cell diameter (µm)}=(\text{Major diameter}+\text{Minor diameter})/2 \quad (1)$$

The tests described above are performed at a temperature of 23° C. at a relative humidity of 55%.

<<Evaluation for Variations in Roller Resistance>>

Figure 2:
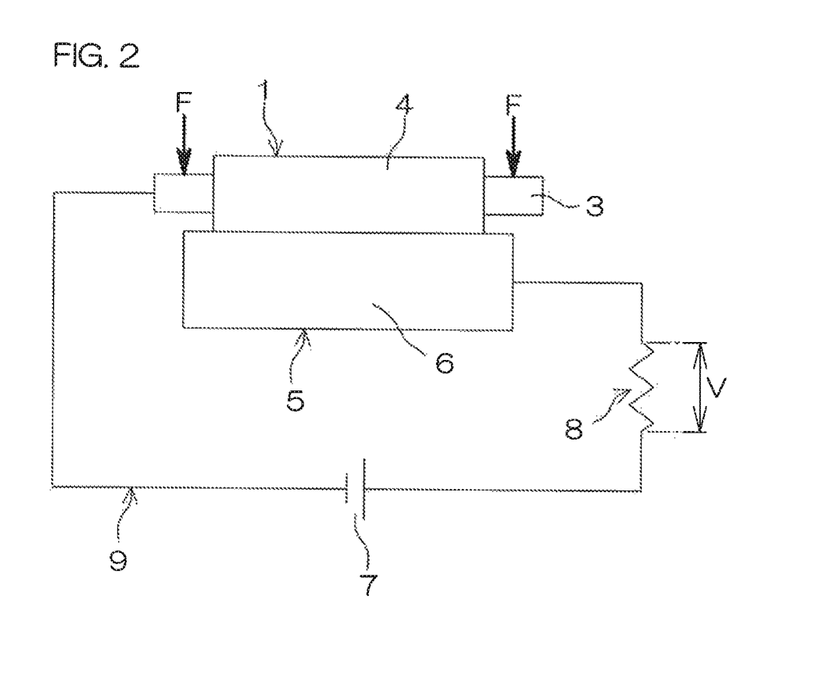
FIG. 2 is a diagram for explaining how to measure the roller resistance of the transfer roller.

FIG. 2 is a diagram for explaining how to measure the roller resistance of the transfer roller.

Referring to FIGS. 1 and 2, the transfer roller 1 is evaluated for the environment-dependent variations in roller resistance based on roller resistances thereof measured by the following method.

An aluminum drum 5 rotatable at a constant rotation speed is prepared, and the outer peripheral surface 4 of the transfer roller 1 to be subjected to the measurement of the roller resistance is brought into contact with an outer peripheral surface 6 of the aluminum drum 5 from above.

A DC power source 7 and a resistor 8 are connected in series between the shaft 3 for the transfer roller 1 and the aluminum drum 5 to provide a measurement circuit 9. The DC power source 7 is connected to the shaft 3 at its negative terminal, and connected to the resistor 8 at its positive terminal. The resistor 8 has a resistance r of 100Ω.

Subsequently, a load F of 500 g is applied to each of opposite end portions of the shaft 3 to bring the transfer roller 1 into press contact with the aluminum drum 5 and, in this state, a detection voltage V applied to the resistor 8 is measured after a lapse of 30 seconds from application of an application voltage E of DC 1000 V from the DC power source 7 between the shaft 3 and the aluminum drum 5 while rotating the aluminum drum 5 (at a rotation speed of 30 rpm).

The roller resistance R of the transfer roller 1 is basically determined from the following expression (i') based on the detection voltage V and the application voltage E (=1000 V):

$$R=r\times E/(V-r) \quad (\text{i}')$$

However, the term −r in the expression (i') is negligible, so that the roller resistance of the transfer roller 1 is determined from the following expression (i) in the present invention:

$$R=r\times E/V \quad (\text{i})$$

The roller resistance $R_{LL}$ (Ω) and the roller resistance $R_{HH}$ (Ω) are determined by performing the measurement of the roller resistance R in a lower temperature and lower humidity environment at a temperature of 10° C. at a relative humidity of 20% and in a higher temperature and higher humidity environment at a temperature of 30° C. at a relative humidity of 80%.

Then, a difference log $R_{LL}$–log $R_{HH}$ between a log $R_{LL}$ value and a log $R_{HH}$ value is determined. A transfer roller having a difference log $R_{LL}$–log $R_{HH}$ of not greater than 1.8 is regarded to have smaller variations, and a transfer roller having a difference log $R_{LL}$–log $R_{HH}$ of greater than 1.8 is regarded to have greater variations.

As apparent from Examples to be described later, the inventive transfer roller 1 has smaller environment-dependent variations in roller resistance with a difference log $R_{LL}$–log $R_{HH}$ of not greater than 1.8.

<<Transfer Roller Production Method>>

In an inventive production method for producing the transfer roller 1, the electrically conductive rubber composition containing the ingredients described above is extruded into a tubular body by means of an extruder. Then, the tubular body is cut to a predetermined length, and the rubber composition of the resulting tubular body is foamed and crosslinked in a vulcanization can by applying heat and pressure to the tubular body with pressurized steam.

Subsequently, the tubular body thus foamed and crosslinked is heated in an oven or the like for secondary crosslinking. Then, the resulting tubular body is cooled, and polished to a predetermined outer diameter.

The shaft 3 is inserted through and fixed to the through-hole 2 at any time between the end of the cutting of the tubular body and the end of the polishing.

However, it is preferred to carry out the secondary crosslinking and the polishing with the shaft 3 inserted through the through-hole 2 after the cutting. This suppresses the warpage and the deformation of the tubular body, which may otherwise occur due to the expansion and the contraction of the tubular body during the secondary crosslinking. Further, the tubular body may be polished while being rotated about the shaft 3. This improves the working efficiency in the polishing, and suppresses the deflection of the outer peripheral surface 4 of the transfer roller 1.

As previously described, the shaft 3 may be inserted through the through-hole 2 of the tubular body yet to be subjected to the secondary crosslinking with the intervention of the electrically conductive adhesive agent (particularly, an electrically conductive thermosetting adhesive agent), followed by the secondary crosslinking. Alternatively, the shaft 3 having an outer diameter that is greater than the inner diameter of the through-hole 2 may be press-inserted through the through-hole 2.

In the former case, the thermosetting adhesive agent is cured when the tubular body is secondarily crosslinked by the heating in the oven. Thus, the shaft 3 is electrically connected to and mechanically fixed to the transfer roller 1. In the latter case, the electrical connection and the mechanical fixing are achieved simultaneously with the press insertion.

<<Image Forming Apparatus>>

An image forming apparatus according to the present invention includes the inventive transfer roller 1. The image forming apparatus according to the present invention may be an electrophotographic image forming apparatus such as a laser printer, an electrostatic copying machine, a plain paper facsimile machine or a printer-copier-facsimile multifunction machine.

EXAMPLES

Example 1

(Electrically Conductive Rubber Composition)

A rubber component was prepared by blending 20 parts by mass of GECO (HYDRIN (registered trade name) T3108 available from Zeon Corporation), 10 parts by mass of EPDM (non-oil-extension type, ESPRENE (registered trade name) 505A available from Sumitomo Chemical Co., Ltd.) and 70 parts by mass of SBR (non-oil-extension type, SBR1502 available from Sumitomo Chemical Co., Ltd.)

While 100 parts by mass of the rubber component including the aforementioned rubbers was simply kneaded by means of a Banbury mixer, a filler and an acid accepting agent out of ingredients shown below in Table 1 were added to and kneaded with the rubber component. Then, the other ingredients were further added to and kneaded with the resulting mixture. Thus, an electrically conductive rubber composition was prepared.

TABLE 1

| Ingredients | Parts by mass |
| --- | --- |
| Foaming agent | 4.0 |
| Foaming assisting agent | 1.5 |
| Filler | 10 |
| Acid accepting agent | 1.5 |
| Crosslinking agent | 1.6 |
| Crosslinking accelerating agent DM | 1.6 |
| Crosslinking accelerating agent TS | 2.0 |

The ingredients shown in Table 1 are as follows. The amounts (parts by mass) of the ingredients shown in Table 1 are based on 100 parts by mass of the overall rubber component.

Foaming agent: ADCA (available under the trade name of VINYFOR AC#3 from Eiwa Chemical Industry Co., Ltd.)
Foaming assisting agent: Urea foaming assisting agent (available under the trade name of CELLPASTE 101 from Eiwa Chemical Industry Co., Ltd.)
Filler: Carbon black HAF (available under the trade name of SEAST 3 from Tokai Carbon Co., Ltd.)
Acid accepting agent: Hydrotalcites (DHT-4A-2 available from Kyowa Chemical Industry Co., Ltd.)
Crosslinking agent: Sulfur powder (available from Tsurumi Chemical Industry Co., Ltd.)
Crosslinking accelerating agent DM: Di-2-benzothiazyl disulfide (available under the trade name of SUNSINE METS from Shandong Shanxian Chemical Co., Ltd.)
Crosslinking accelerating agent TS: Tetramethylthiuram disulfide (SANCELER (registered trade name) TS available from Sanshin Chemical Industry Co., Ltd.)

(Transfer Roller)

The electrically conductive rubber composition thus prepared was fed into an extruder, and extruded into a tubular body having an outer diameter of 10 mm and an inner diameter of 3.0 mm. Then, the tubular body was cut to a predetermined length, and fitted around a temporary crosslinking shaft having an outer diameter of 2.2 mm.

Then, the tubular body was pressurized and heated at 120° C. for 10 minutes and then at 160° C. for 20 minutes in a vulcanization can by pressurized steam, whereby the tubular body was foamed by gas generated by decomposition of the foaming agent and the rubber component was crosslinked.

Subsequently, the tubular body was removed from the temporary shaft, and then fitted around a shaft 3 having an outer diameter of 5 mm and an outer peripheral surface to which an electrically conductive thermosetting adhesive agent was applied. The tubular body was heated in an oven at 160° C. for 60 minutes, whereby the rubber component of the tubular body was secondarily crosslinked and the thermosetting adhesive agent was cured. Thus, the tubular body was electrically connected to and mechanically fixed to the shaft 3.

In turn, opposite end portions of the tubular body were cut, and the outer peripheral surface 4 of the resulting tubular body was traverse-polished to an outer diameter of

Example 2

An electrically conductive rubber composition was prepared and a transfer roller 1 was produced in substantially the same manner as in Example 1, except that the proportion of the ADCA foaming agent was 6.0 parts by mass based on 100 parts by mass of the overall rubber component and the proportion of the urea foaming assisting agent was 2.5 parts by mass based on 100 parts by mass of the overall rubber component.

Example 3

An electrically conductive rubber composition was prepared and a transfer roller 1 was produced in substantially the same manner as in Example 1, except that the rubber component was prepared by blending 20 parts by mass of the same GECO, 10 parts by mass of the same EPDM and 40 parts by mass of the same SBR as used in Example 1, and 30 parts by mass of NBR (JSR N250SL, lower acrylonitrile content NBR of non-oil-extension type having an acrylonitrile content of 20% and available from JSR Co, Ltd.), and the proportion of the urea foaming assisting agent was 2.5 parts by mass based on 100 parts by mass of the overall rubber component.

Example 4

An electrically conductive rubber composition was prepared and a transfer roller 1 was produced in substantially the same manner as in Example 3, except that the proportions of the SBR and the NBR for the rubber component were 30 parts by mass and 40 parts by mass, respectively.

Example 5

An electrically conductive rubber composition was prepared and a transfer roller 1 was produced in substantially the same manner as in Example 1, except that the same proportion of BR (JSR BR01, non-oil-extension type available from JSR Co., Ltd.) was blended instead of the SBR for the rubber component, and the proportion of the urea foaming assisting agent was 2.5 parts by mass based on 100 parts by mass of the overall rubber component.

Example 6

An electrically conductive rubber composition was prepared and a transfer roller 1 was produced in substantially the same manner as in Example 5, except that the proportion of the BR for the rubber component was 40 parts by mass and 30 parts by mass of the same NBR as used in Example 3 was further blended for the rubber component.

Comparative Example 1

An electrically conductive rubber composition was prepared and a transfer roller 1 was produced in substantially the same manner as in Example 1, except that the proportion of the urea foaming assisting agent was 1.0 part by mass based on 100 parts by mass of the overall rubber component.

Comparative Example 2

An electrically conductive rubber composition was prepared and a transfer roller 1 was produced in substantially the same manner as in Example 1, except that the proportion of the ADCA foaming agent was 6.0 parts by mass based on 100 parts by mass of the overall rubber component and the proportion of the urea foaming assisting agent was 2.8 parts by mass based on 100 parts by mass of the overall rubber component.

Conventional Example 1

An electrically conductive rubber composition was prepared and a transfer roller 1 was produced in substantially the same manner as in Example 1, except that the proportion of the urea foaming assisting agent was 4.0 parts by mass based on 100 parts by mass of the overall rubber component. Conventional Example 1 corresponds to Patent Document 1.

Conventional Example 2

An electrically conductive rubber composition was prepared and a transfer roller 1 was produced in substantially the same manner as in Example 1, except that 70 parts by mass of the same NBR as used in Examples 3 and 4 was blended instead of the SBR for the rubber component and the proportion of the urea foaming assisting agent was 4.0 parts by mass based on 100 parts by mass of the overall rubber component.

<Measurement of Asker-C Hardness and Evaluation>

The Asker-C hardness of each of the transfer rollers 1 produced in Examples, Comparative Examples and Conventional Examples was measured by the measurement method described above. A transfer roller having an Asker-C hardness of not lower than 25 degrees and not higher than 35 degrees was rated as acceptable (o), and a transfer roller having an Asker-C hardness of lower than 25 degrees or higher than 35 degrees was rated as unacceptable (x).

<Measurement of Average Cell Diameter and Evaluation>

The average cell diameter of each of the transfer rollers 1 produced in Examples, Comparative Examples and Conventional Examples was measured by the measurement method described above. A transfer roller having an average cell diameter of not greater than 350 μm was rated as acceptable (○), and a transfer roller having an average cell diameter of greater than 350 μm was rated as unacceptable (x).

<Evaluation for Variations in Roller Resistance>

The roller resistance $R_{LL}$ (Ω) and the roller resistance $R_{HH}$ (Ω) of each of the transfer rollers 1 produced in Examples, Comparative Examples and Conventional Examples were measured in a lower temperature and lower humidity environment at a temperature of 10° C. at a relative humidity of 20% and in a higher temperature and higher humidity environment at a temperature of 30° C. at a relative humidity of 80%, respectively, by the measurement method described above. Then, a difference log $R_{LL}$–log $R_{HH}$ between a log $R_{LL}$ value and a log $R_{HH}$ value was determined. A transfer roller having a difference log $R_{LL}$–log $R_{HH}$ of not greater than 1.8 was rated as acceptable (○), and a transfer roller having a difference log $R_{LL}$–log $R_{HH}$ of greater than 1.8 was rated as unacceptable (x).

The above results are shown in Tables 2 and 3.

TABLE 2

|  | Example 1 | Example 2 | Example 3 | Example 4 | Example 5 | Example 6 |
|---|---|---|---|---|---|---|
| Parts by mass | | | | | | |
| SBR | 70 | 70 | 40 | 30 | — | — |
| BR | — | — | — | — | 70 | 40 |
| NBR | — | — | 30 | 40 | — | 30 |
| GECO | 20 | 20 | 20 | 20 | 20 | 20 |
| EPDM | 10 | 10 | 10 | 10 | 10 | 10 |
| Forming agent | 4.0 | 6.0 | 4.0 | 4.0 | 4.0 | 4.0 |
| Forming assisting agent | 1.5 | 2.5 | 2.5 | 2.5 | 2.5 | 2.5 |
| Evaluation | | | | | | |
| Asker-C hardness | ○ | ○ | ○ | ○ | ○ | ○ |
| Average cell diameter | ○ | ○ | ○ | ○ | ○ | ○ |
| Variations in roller resistance | ○ | ○ | ○ | ○ | ○ | ○ |

TABLE 3

|  | Comparative Example 1 | Comparative Example 2 | Conventional Example 1 | Conventional Example 2 |
|---|---|---|---|---|
| Parts by mass | | | | |
| SBR | 70 | 70 | 70 | — |
| BR | — | — | — | — |
| NBR | — | — | — | 70 |
| GECO | 20 | 20 | 20 | 20 |
| EPDM | 10 | 10 | 10 | 10 |
| Forming agent | 4.0 | 6.0 | 4.0 | 4.0 |
| Forming assisting agent | 1.0 | 2.8 | 4.0 | 4.0 |
| Evaluation | | | | |
| Asker-C hardness | x | ○ | ○ | ○ |
| Average cell diameter | x | ○ | ○ | ○ |
| Variations in roller resistance | ○ | x | x | ○ |

The results for Examples 1 to 6 shown in Tables 2 and 3 indicate that, where the SBR and/or the BR which are less expensive than the NBR are used as the main rubber, the transfer roller can be produced at lower costs than the transfer roller of Conventional Example 2 employing the NBR as having moderate flexibility comparable to that of the transfer roller of Conventional Example 2, smaller cell diameters to ensure higher-quality image formation, and smaller environment-dependent variations in roller resistance.

However, the results for examples 1 to 6, Comparative Examples 1 and 2 and conventional Example 1 indicate that the proportion of the foaming agent should be 4 to 6 parts by mass and the proportion of the foaming assisting agent should be 1.5 to 2.7 parts by mass, particularly preferably not greater than 2.5 parts by mass, based on 100 parts by mass of the overall rubber component in order to reduce the environment-dependent variations in the roller resistance of the transfer roller.

Further, the results for Examples 1 to 6 indicate that the SBR and/or the BR may be partly replaced with the polar rubber such as the NBR and, in this case, the proportion of the polar rubber is preferably not greater than 40 parts by mass based on 100 parts by mass of the overall rubber component.

This application corresponds to Japanese Patent Application No. 2016-147286 filed in the Japan Patent Office on Jul. 27, 2016, the disclosure of which is incorporated herein by reference in its entirety.

What is claimed is:

1. A transfer roller production method comprising the steps of:
   extruding an electrically conductive rubber composition into a tubular body, the electrically conductive rubber composition comprising: a rubber component consisting of ethylene propylene diene rubber, epichlorohydrin rubber and butadiene rubber; a crosslinking component for crosslinking the rubber component; a foaming agent thermally decomposable to generate gas, the foaming agent being present in the rubber composition in a proportion of not less than 4 parts by mass and not greater than 6 parts by mass based on 100 parts by mass of the overall rubber component; and a foaming assisting agent which accelerates decomposition of the foaming agent, the foaming assisting agent being present in the rubber composition in a proportion of not less than 1.5 parts by mass and not greater than 2.7 parts by mass based on 100 parts by mass of the overall rubber component; and
   foaming and crosslinking the electrically conductive rubber composition extruded into the tubular body in a vulcanization can by applying pressure and heat to the tubular body with pressurized steam through an in-can vulcanization process.

2. A transfer roller produced by the production method according to claim 1, the transfer roller having a roller resistance $R_{LL}$ (Ω) as measured in a lower temperature and lower humidity environment at a temperature of 10° C. at a relative humidity of 20% and a roller resistance $R_{HH}$ (Ω) as measured in a higher temperature and higher humidity environment at a temperature of 30° C. at a relative humidity of 80%, wherein a difference log $R_{LL}$–log $R_{HH}$ between a log $R_{LL}$ value and a log $R_{HH}$ value is not greater than 1.8.

3. An image forming apparatus comprising the transfer roller according to claim 2.

4. The transfer roller production method according to claim 1,
   wherein said foaming agent is azodicarbonamide, and said foaming assisting agent is a urea foaming assisting agent.

5. The transfer roller production method according to claim 1,
   wherein said crosslinking component is a sulfur-containing crosslinking agent.

6. The transfer roller production method according to claim 1,
   wherein said foaming assisting agent includes a thiuram accelerating agent and a thiazole accelerating agent, which are used in combination.

7. A transfer roller production method comprising the steps of:
   extruding an electrically conductive rubber composition into a tubular body, the electrically conductive rubber composition comprising: a rubber component consisting of ethylene propylene diene rubber, epichlorohydrin rubber, butadiene rubber, and at least one polar rubber selected from the group consisting of acrylonitrile butadiene rubber, chloroprene rubber and acryl rubber; a crosslinking component for crosslinking the rubber component; a foaming agent thermally decomposable to generate gas, the foaming agent being present in the rubber composition in a proportion of not less than 4 parts by mass and not greater than 6 parts by mass based on 100 parts by mass of the overall rubber component; and a foaming assisting agent which accelerates decomposition of the foaming agent, the foaming assisting agent being present in the rubber composition in a proportion of not less than 1.5 parts by mass and not greater than 2.7 parts by mass based on 100 parts by mass of the overall rubber component; and foaming and crosslinking the electrically conductive rubber composition extruded into the tubular body in a vulcanization can by applying pressure and heat to the tubular body with pressurized steam through an in-can vulcanization process.

8. A transfer roller produced by the production method according to claim 7, the transfer roller having a roller resistance $R_{LL}$ ($\Omega$) as measured in a lower temperature and lower humidity environment at a temperature of 10° C. at a relative humidity of 20% and a roller resistance $R_{HH}$ ($\omega$) as measured in a higher temperature and higher humidity environment at a temperature of 30° C. at a relative humidity of 80%, wherein a difference log $R_{LL}$–log $R_{HH}$ between a log $R_{LL}$ value and a log $R_{HH}$ value is not greater than 1.8.

9. An image forming apparatus comprising the transfer roller according to claim 8.

10. The transfer roller production method according to claim 7,
wherein said foaming agent is azodicarbonamide, and said foaming assisting agent is a urea foaming assisting agent.

11. The transfer roller production method according to claim 7,
wherein said crosslinking component is a sulfur-containing crosslinking agent.

12. The transfer roller production method according to claim 7,
wherein said foaming assisting agent includes a thiuram accelerating agent and a thiazole accelerating agent, which are used in combination.

\* \* \* \* \*

UNITED STATES PATENT AND TRADEMARK OFFICE
CERTIFICATE OF CORRECTION

PATENT NO. : 10,481,529 B2
APPLICATION NO. : 15/635434
DATED : November 19, 2019
INVENTOR(S) : Yusuke Tanio It is certified that error appears in the above-identified patent and that said Letters Patent is hereby corrected as shown below:

In the Claims

In Claim 8, at Column 20, Line 1, please replace:
"($\omega$)" with -- ($\Omega$) --

Signed and Sealed this
Fourteenth Day of January, 2020

Andrei Iancu
*Director of the United States Patent and Trademark Office*